United States Patent
McElroy et al.

(10) Patent No.: US 8,916,300 B2
(45) Date of Patent: Dec. 23, 2014

(54) AMMONIA FUELED SOFC SYSTEM

(75) Inventors: James McElroy, Suffield, CT (US);
Arne Ballantine, Palo Alto, CA (US);
Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 13/606,765

(22) Filed: Sep. 7, 2012

(65) Prior Publication Data

US 2014/0072889 A1 Mar. 13, 2014

(51) Int. Cl.
*H01M 8/06* (2006.01)

(52) U.S. Cl.
USPC .......................... 429/411; 429/415; 429/410

(58) Field of Classification Search
None
See application file for complete search history.

(56) References Cited

U.S. PATENT DOCUMENTS

| | | | |
|---|---|---|---|
| 5,582,624 A * | 12/1996 | Jantsch et al. | 29/623.1 |
| 6,924,053 B2 | 8/2005 | McElroy | |
| 7,811,442 B2 | 10/2010 | Holbrook et al. | |
| 7,833,668 B2 | 11/2010 | Ballantine et al. | |
| 7,883,803 B2 | 2/2011 | McElroy et al. | |
| 2007/0178338 A1 | 8/2007 | McElroy et al. | |
| 2007/0207351 A1 | 9/2007 | Christensen et al. | |
| 2008/0057359 A1* | 3/2008 | Venkataraman et al. | 429/13 |
| 2008/0241612 A1 | 10/2008 | Ballantine et al. | |
| 2008/0241638 A1 | 10/2008 | McElroy et al. | |
| 2009/0035619 A1* | 2/2009 | Adams | 429/17 |
| 2009/0053569 A1* | 2/2009 | Perry et al. | 429/26 |
| 2009/0123361 A1* | 5/2009 | Johannessen et al. | 423/352 |
| 2010/0047635 A1* | 2/2010 | Lyons | 429/17 |
| 2010/0239924 A1 | 9/2010 | McElroy et al. | |
| 2011/0008687 A1 | 1/2011 | Ballantine et al. | |
| 2011/0281185 A1 | 11/2011 | Sridhar et al. | |
| 2012/0189923 A1* | 7/2012 | Hemmes et al. | 429/410 |

FOREIGN PATENT DOCUMENTS

JP 2008222189 A * 9/2008

OTHER PUBLICATIONS

Patel et al., "Co-Production of Electricity and Hydrogen Using NH3-Fueled SOFC Systems," Presentation at Ammonia Fuel Conference, Oct. 2006, Golden, CO.
Dekker et al., "Highly Efficient Conversion of Ammonia in Electricity by Solid Oxide Fuel Cells," Presentation at 6th European Solid Oxide Fuel Cell Forum, Jun. 28-Jul. 2, 2004, Lucerne, Switzerland.
J. Ganley, "Ammonia: The Key to a Hydrogen Economy—Ammonia Fuel Cell Systems," Howard University, Department of Chemical Engineering, 2005.
U.S. Appl. No. 13/603,581, James McElroy et al., "Ammonia of Hydrazine Injection into Fuel Cell Systems," filed Sep. 5, 2012, Specification and drawings.

* cited by examiner

*Primary Examiner* — Patrick Ryan
*Assistant Examiner* — Haixia Zhang
(74) *Attorney, Agent, or Firm* — The Marbury Law Group PLLC

(57) ABSTRACT

Systems and methods are provided in which ammonia is used as a fuel source for solid oxide fuel cell systems. In the various aspects a high temperature fuel cell stack exhaust stream is recycled through one or more separation or conversion devices to create a purified recycled fuel exhaust stream that is recycled back into the fuel inlet stream of the high temperature fuel cell stack. In various aspects a nitrogen separator may remove nitrogen from the recycled fuel cell stack exhaust stream, a water separator may remove water from the recycled fuel cell stack exhaust stream, and/or an ammonia reactor and hydrogen separator may be used to condition the fuel inlet stream of the high temperature fuel cell stack. In a further aspect a molten carbonate fuel cell and/or Sabatier reactor may be used to condition the fuel inlet stream of the high temperature fuel cell stack.

1 Claim, 9 Drawing Sheets

AMMONIA FUELED SOFC SYSTEM

BACKGROUND

The present invention relates generally to the field of fuel cell systems and more particularly to ammonia fueled fuel cell systems.

Fuel cells are electrochemical devices which can convert energy stored in fuels to electrical energy efficiencies. High temperature fuel cells include solid oxide and molten carbonate fuel cells. There are classes of fuel cells, such as the solid oxide regenerative fuel cells, that also allow reversed operation, such that oxidized fuel can be reduced back to unoxidized fuel using electrical energy as an input.

SUMMARY OF THE INVENTION

The embodiments of the invention provide systems and methods in which ammonia is used as a fuel source for solid oxide fuel cell systems. In the various embodiments of the invention a high temperature fuel cell stack exhaust stream is recycled through one or more separation or conversion devices to create a purified recycled fuel exhaust stream that is recycled back into the fuel inlet stream of the high temperature fuel cell stack. In an aspect a separator may separate hydrogen from nitrogen and any other remaining fuel exhaust stream components and remove nitrogen from the recycled fuel cell stack exhaust stream. In another aspect a water separator may remove water from the recycled fuel cell stack exhaust stream. In another aspect an ammonia reactor and hydrogen separator may be used to condition the fuel inlet stream of the high temperature fuel cell stack. In a further aspect a molten carbonate fuel cell and/or Sabatier reactor may be used to condition the fuel inlet stream of the high temperature fuel cell stack.

DETAILED DESCRIPTION OF THE EMBODIMENTS

The embodiments of the invention illustrate how ammonia may be used as a fuel source for solid oxide fuel cell systems. Additional embodiments illustrate how a high temperature fuel cell stack exhaust stream may be recycled through one or more separation or conversion devices to create a purified recycled fuel exhaust stream that may be recycled back into the fuel inlet stream of the high temperature fuel cell stack. Further embodiments illustrate how a separator may separate hydrogen from nitrogen and any other remaining fuel exhaust stream components and remove nitrogen from the recycled fuel cell stack exhaust stream. Additional embodiments illustrate how a water separator may remove water from the recycled fuel cell stack exhaust stream. Still further embodiments illustrate how an ammonia reactor and hydrogen separator may be used to condition the fuel inlet stream of the high temperature fuel cell stack. Yet further embodiments illustrate how a molten carbonate fuel cell and/or Sabatier reactor may be used to condition the fuel inlet stream of the high temperature fuel cell stack.

Ammonia fueled solid oxide fuel cell systems may have several advantages. When using ammonia ($NH_3$) as a fuel source, no carbon oxides may be released into the atmosphere by the solid oxide fuel cell system. Ammonia fuel may be domestically produced from air and water using carbon oxide free solar and/or nuclear generated electricity. Ammonia fuel may also be produced from domestic carbon bearing fuels in a process which may yield a pure carbon dioxide waste product which may be easily sequestered. Ammonia fuel may be easily transported by rail, barge, and trucks as a low pressure liquid. Additionally, solid oxide fuel cell system simplifications and fuel utilization improvements may be realized with ammonia fuel byproduct separation techniques.

Figure 1A:
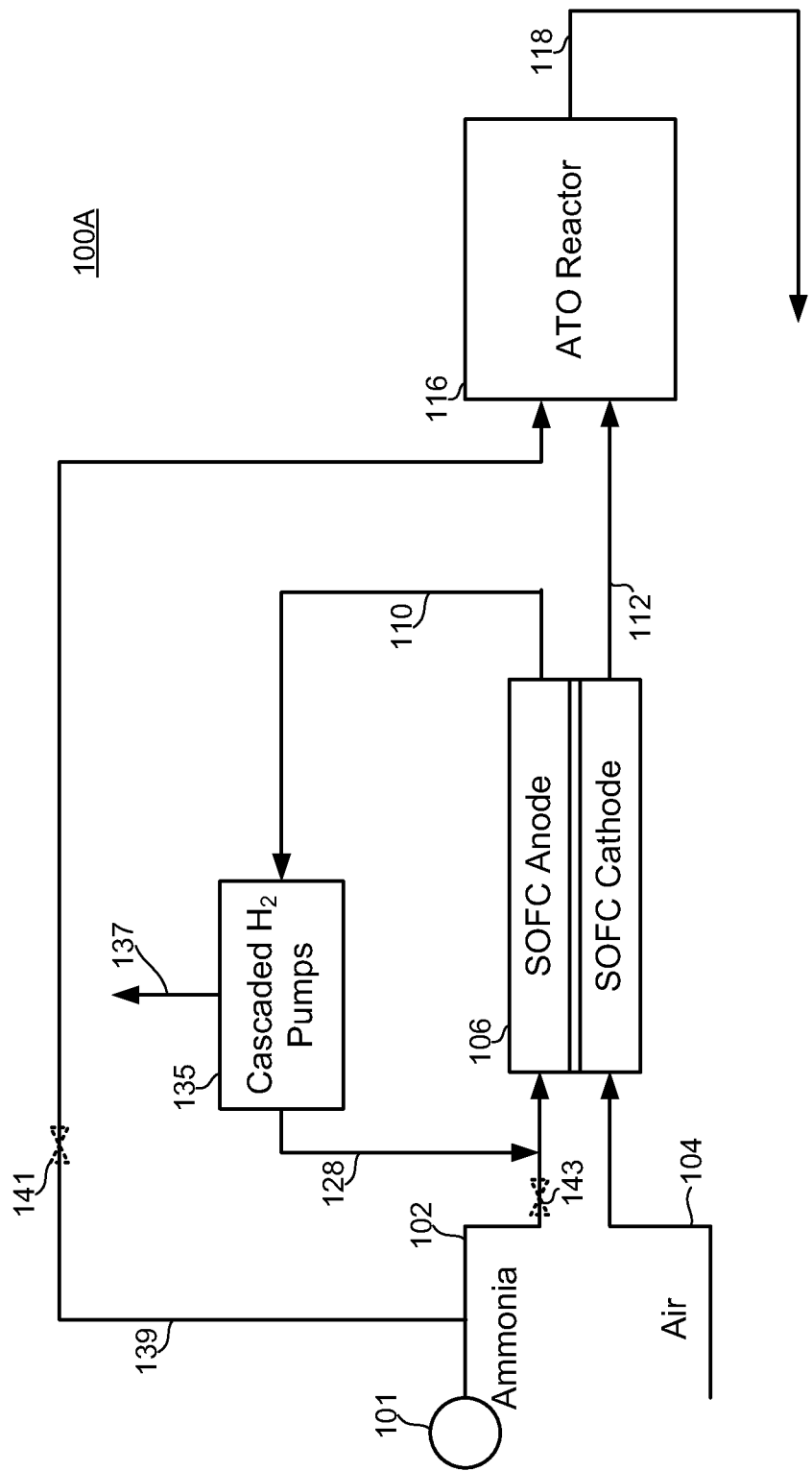
FIGS. 1A-7 are schematics of fuel cell systems according to embodiments of the present invention.

FIG. 1A illustrates a fuel cell system 100A according to one embodiment of the present invention. Preferably, the system 100A is a high temperature fuel cell system, such as a solid oxide fuel cell (SOFC) system. The system 100A may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100A contains a high temperature fuel cell stack 106. The stack may contain a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia and/or doped ceria cermet, and a cathode electrode, such as lanthanum strontium manganite. Each fuel cell contains an electrolyte, an anode electrode on one side of the electrolyte anode chamber, a cathode electrode on the other side of the electrolyte in a cathode chamber, as well as other components, such as separator plates (i.e., interconnects)/electrical contacts (i.e., end plates), seals, fuel cell housing (e.g., hot box containing heat exchanger(s), blower(s), and plumbing), and insulation. In an SOFC operating in the fuel cell mode, the oxidizer, such as air or oxygen gas, enters the cathode chamber, while the fuel, such as ammonia ($NH_3$), enters the anode chamber. Any suitable fuel cell designs and component materials may be used. The system 100A further contains an anode tail gas oxidizer (ATO) reactor 116 and a series of cascaded hydrogen ($H_2$) pumps 135.

In an embodiment, the cascaded hydrogen pumps 135 may be a plurality (e.g., two or more) cascaded electrochemical hydrogen pump separation units, such as a high temperature proton exchange membrane (PEM) fuel cell stack operating in pump (i.e., electrolysis) mode (i.e., with a voltage applied to the device). As used herein, the term "cascaded" refers to series connected pumps in which the output of one pump is used as the input of the next pump in the series. In an embodiment, the cascaded hydrogen pumps 135 may be three hydrogen pumps connected in series. However, four or more pumps may also be used. The cascaded hydrogen pumps 135 may electrochemically separate hydrogen ($H_2$) from a received anode exhaust stream which contains nitrogen, water and optionally other residual components.

The system 100A operates as follows. The fuel inlet stream, such as ammonia ($NH_3$), is provided into the fuel cell stack 106 through fuel inlet conduit 102 from an ammonia fuel source 101. An ammonia ($NH_3$) fuel source 101 may be a tank of ammonia and/or a conduit which may provide ammonia into fuel inlet conduit 102 and/or a portion of a fuel inlet conduit that is distal from the fuel cell stack which carries ammonia away from a remote source.

For example, in one non-limiting embodiment, the fuel cell system 100 may be located at a water (e.g., drinking water) treatment plant, a waste water treatment plant or a sewage treatment plant. Ammonia is used in several areas of water, waste water or sewage treatment, either as an added ingredient or as a by-product of the treatment. For example, ammonia may be used for regeneration of weak anion exchange resins, in combination with chlorine to produce drinking (potable) water, as pH control agent and/or as an oxygen scavenger in boiler water treatment, and/or ammonia may comprise a by-product of sewage treatment. The ammonia used or generated in the treatment plant may be provided from the treatment plant to the fuel cell system as the ammonia fuel. The fuel cell system 100A may be used to provide electricity to the treatment plant components that are electrically powered, such as water or sewage pump(s), motor(s) (e.g., tank stirrer motor(s)), blower(s), etc. Thus, the ammonia source 101 may comprise an ammonia conduit or tank that contains ammonia provided from the treatment plant that is powered by the fuel cell system 100A.

The fuel inlet conduit 102 provides the fuel inlet stream to the anode side of the cells in the fuel cell stack 106. In an optional embodiment, an optional regulator 143, such as a manual and/or computer controlled regulator valve, may be provided in the fuel inlet conduit 102 to regulate the pressure of the fuel inlet stream provided to the anode side of the cells in the fuel cell stack 106. For example, the fuel inlet stream pressure may be maintained at approximately 1.0 PSI, such as 1.0 PSI, less than 1.0 PSI, such as 0.95-1.0 PSI or 0.90-0.95 PSI, or greater than 1.0 PSI, such as 1.0-1.5 PSI or 1.5 PSI-2.0 PSI. Air or another oxygen containing gas is provided into the stack 106 through an air inlet conduit 104. The air inlet conduit 104 provides air to the cathode side of the cells in the fuel cell stack 106.

Once the fuel, such as ammonia, and oxidant are provided into the fuel cell stack 106, the stack 106 is operated to generate electricity and a fuel exhaust stream. Ammonia ($NH_3$) and oxygen ($O_2$) ionically conducted from the cathode to the anode may react to form nitrogen ($N_2$), hydrogen ($H_2$), and water vapor ($H_2O$). The fuel exhaust stream may contain nitrogen ($N_2$), hydrogen ($H_2$), and water vapor ($H_2O$), and other reaction by-products and impurities, as well as unreacted ammonia ($NH_3$) depending on whether the reaction is complete or not.

The fuel exhaust stream (i.e., the stack anode exhaust stream) is provided from the stack 106 via fuel exhaust conduit 110 and recycled through the pumps 135 back toward the anode side of the cells in the fuel cell stack 106. Preferably, the entire fuel exhaust stream is provided into the pumps 135 through conduit 110 and no fuel exhaust stream is provided to the ATO reactor 116 (i.e., there is no direct fluid connection between the fuel exhaust of the stack 106 and the ATO reactor 116). The air exhaust stream (i.e., the stack cathode exhaust stream) is provided from the stack air exhaust outlet via air exhaust conduit 112.

The ATO reactor 116 contains a catalyst and receives a fuel stream from the fuel inlet conduit 102 or directed from source 101 via an ATO input conduit 139. The fuel stream comprises an ammonia stream. A splitter may be placed in conduit 102 to split the ammonia fuel stream between conduits 102 and 139. Alternatively, conduit 139 may be connected directed to the source 101. The ATO reactor 116 receives air from the stack 106 via the air exhaust conduit 112. Preferably, all of the ATO reactor fuel is received from the source 101 rather than from the stack fuel exhaust stream. In an optional embodiment, an optional valve 141, such as a manual and/or computer controlled regulator valve, may be provided in the ATO input conduit 139 and may control the flow of fuel to the ATO reactor 116. The ATO reactor 116 uses the combined fuel stream and air exhaust stream to output heated oxidized fuel (i.e., reactor exhaust) to ATO exhaust conduit 118. In an embodiment, the ATO reactor 116 may provide heat to the hot box containing the fuel stack 106 and/or to system components in the hot box or adjacent to the hot box (e.g., heat exchanger(s), water evaporator, etc.).

The recycled fuel exhaust stream from conduit 110 may be provided to the cascaded hydrogen pumps 135. The cascaded hydrogen pumps 135 may be located outside of the hot box containing the fuel stack 106 or may be located in system housing containing the hot box. The cascaded hydrogen pumps 135 remove hydrogen from the recycled fuel exhaust stream, leaving nitrogen, water, and trace amounts of hydrogen from the recycled fuel exhaust stream to be discharged away from the fuel inlet stream or additionally out of the system 100A via discharge conduit 137. Preferably, the cascaded hydrogen pumps 135 remove substantially all the hydrogen from the recycled fuel exhaust stream creating a purified recycled fuel exhaust stream (e.g., mostly hydrogen and some residual water) comprising substantially no nitrogen. The cascaded hydrogen pumps 135 may remove more than 50%, such as 50% to 100%, 50% to 60%, 60% to 70%, 70% to 80%, 80% to 90%, or 90% to 100%, such at about 98%, about 99%, or about 99.5% of the hydrogen from the recycled fuel exhaust stream resulting in a purified recycled fuel exhaust stream comprising less nitrogen than the recycled fuel exhaust stream entering the cascaded hydrogen pumps 135 via conduit 110, for example, at least 50%, such as 50% to 100%, 50% to 60%, 60% to 70%, 70% to 80%, 80% to 90%, or 90% to 100% less, such at about 98% less, about 99% less, or about 99.5% less nitrogen. The cascaded hydrogen pumps 135 may remove less than 75%, such as 50%-75%, 74% to 75%, 73% to 74%, 72% to 73%, 71% to 70%, 60% to 70%, or 50% to 60%, or more than 75%, such as 75%-100%; 75% to 76%, 76% to 77%, 77% to 78%, 78% to 79%, 79% to 80%, 80% to 90%, or 90% to 100% of the water from the recycled fuel exhaust stream.

The purified recycled fuel exhaust stream (e.g., mostly hydrogen and some residual water), with a reduced amount of nitrogen and water, is provided back to the fuel inlet stream for the fuel stack 106 via recycling conduit 128. The recycling of nitrogen depleted fuel exhaust into the fuel inlet increases the performance of the fuel cell stack 106. The removal of nitrogen results in the recycled fuel exhaust stream in recycling conduit 128 having an increased proportion of hydrogen as a percentage of volume when compared to the fuel exhaust stream originally exiting the fuel cell stack 106 via the fuel exhaust conduit 110.

Figure 1B:
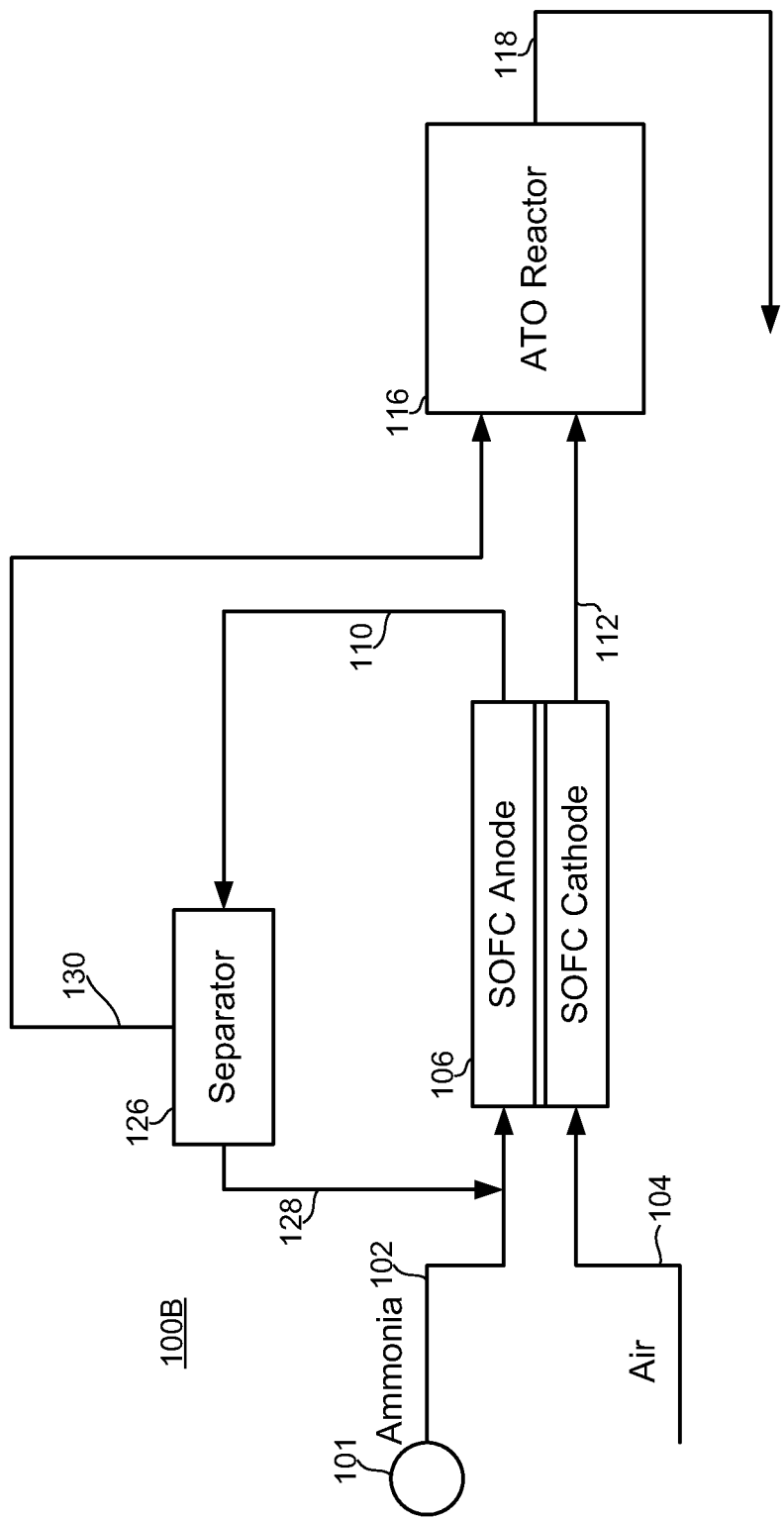

FIG. 1B illustrates a system 100A according to another embodiment of the invention. The system 100A is similar to system 100B illustrated in FIG. 1A and contains a number of components in common. Those components which are common to both systems 100A and 100B are numbered with the same numbers in FIGS. 1A and 1B and will not be described further.

One difference between systems 100B and 100A is that system 100B provides an output fuel stream from a separator 126 to the ATO reactor 116. In an embodiment, the separator 126 may be any type of separation device, such as a hydrogen separator comprising a high temperature proton exchange membrane (PEM) fuel cell stack operating in pump (i.e., electrolysis) mode (i.e., with a voltage applied to the device). Preferably, the separator 126 is not a cascaded series of pumps 135 shown in FIG. 1A. Thus, the separator 126 separates less than 99% of hydrogen from the fuel exhaust stream, such as 75-95%, for example, 85-90% of hydrogen. The remaining hydrogen in the fuel exhaust stream is then provided as fuel to the ATO reactor 116. Thus, conduit 139 may be omitted and ammonia fuel directly from the source 101 does not need to be provided to the ATO reactor 116 in the embodiment of FIG. 1B. The separator 126 may electrochemically pump hydrogen ($H_2$) from an input stream creating an output stream of hydrogen ($H_2$) and leaving nitrogen ($N_2$), water ($H_2O$), trace amounts of hydrogen ($H_2$), and/or other elements, such as carbon, in another output stream.

The system 100B operates as follows. The fuel inlet stream, such as ammonia ($NH_3$), is provided into the fuel cell stack 106 through fuel inlet conduit 102 from an ammonia fuel source 101. Air or another oxygen containing gas is provided into the stack 106 through an air inlet conduit 104. The air inlet conduit 104 provides air to the cathode side of the cells in the fuel cell stack 106. The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 may recycle the fuel exhaust stream (e.g., entire stream) to an input of the separator 126. Preferably, conduit 110 is not directly connected to the ATO reactor 116.

The separator 126 may be located outside of the hot box containing the fuel stack 106 or may be located in system housing containing the hot box. The separator 126 removes hydrogen from the fuel exhaust stream leaving nitrogen, water, and residual amount of hydrogen. Preferably, the separator 126 removes the majority but not all of the hydrogen from the recycled fuel exhaust stream. The separator 126 may remove more than 50%, such as 50% to 95%, 50% to 60%, 60% to 70%, 70% to 80%, 80% to 90%, or 90% to 95%, such at about 90% of the hydrogen from the recycled fuel exhaust stream resulting in a purified recycled fuel exhaust stream comprising less nitrogen than the recycled fuel exhaust stream entering the separator 126 via conduit 110. For example, the recycled fuel exhaust stream contains at least 50% less, such as 50% to 100%, 50% to 60%, 60% to 70%, 70% to 80%, 80% to 90%, or 90% to 100% less, such at about 98% less, about 99% less, or about 99.5% less nitrogen than the fuel exhaust stream provided into the separator 126. The separator 126 may remove less than 75%, such as 50%-75%, 74% to 75%, 73% to 74%, 72% to 73%, 71% to 70%, 60% to 70%, or 50% to 60%, or more than 75%, such as 75%-100%; 75% to 76%, 76% to 77%, 77% to 78%, 78% to 79%, 79% to 80%, 80% to 90%, or 90% to 100% of the water from the recycled fuel exhaust stream. Discharge conduit 130 may discharge the separated nitrogen and water and remaining elements (e.g., hydrogen) in the fuel exhaust stream to the ATO reactor 116. In an embodiment, the separator 126 may not remove all the hydrogen from the recycled fuel exhaust stream, and the ATO reactor 116 may combust the remaining hydrogen with air provided from conduit 112.

The purified recycled fuel exhaust stream (e.g., mostly hydrogen and some residual water), with a reduced amount of nitrogen and water, is provided back to the fuel inlet stream for the fuel stack 106 via recycling conduit 128. The recycling of hydrogen (i.e., nitrogen depleted fuel exhaust stream) into the fuel inlet increases the performance of the fuel cell stack 106. The removal of nitrogen results in the recycled fuel exhaust stream in recycling conduit 128 having an increased proportion of hydrogen as a percentage of volume when compared to the fuel exhaust stream originally exiting the fuel cell stack 106 via the fuel exhaust conduit 110.

Figure 2A:
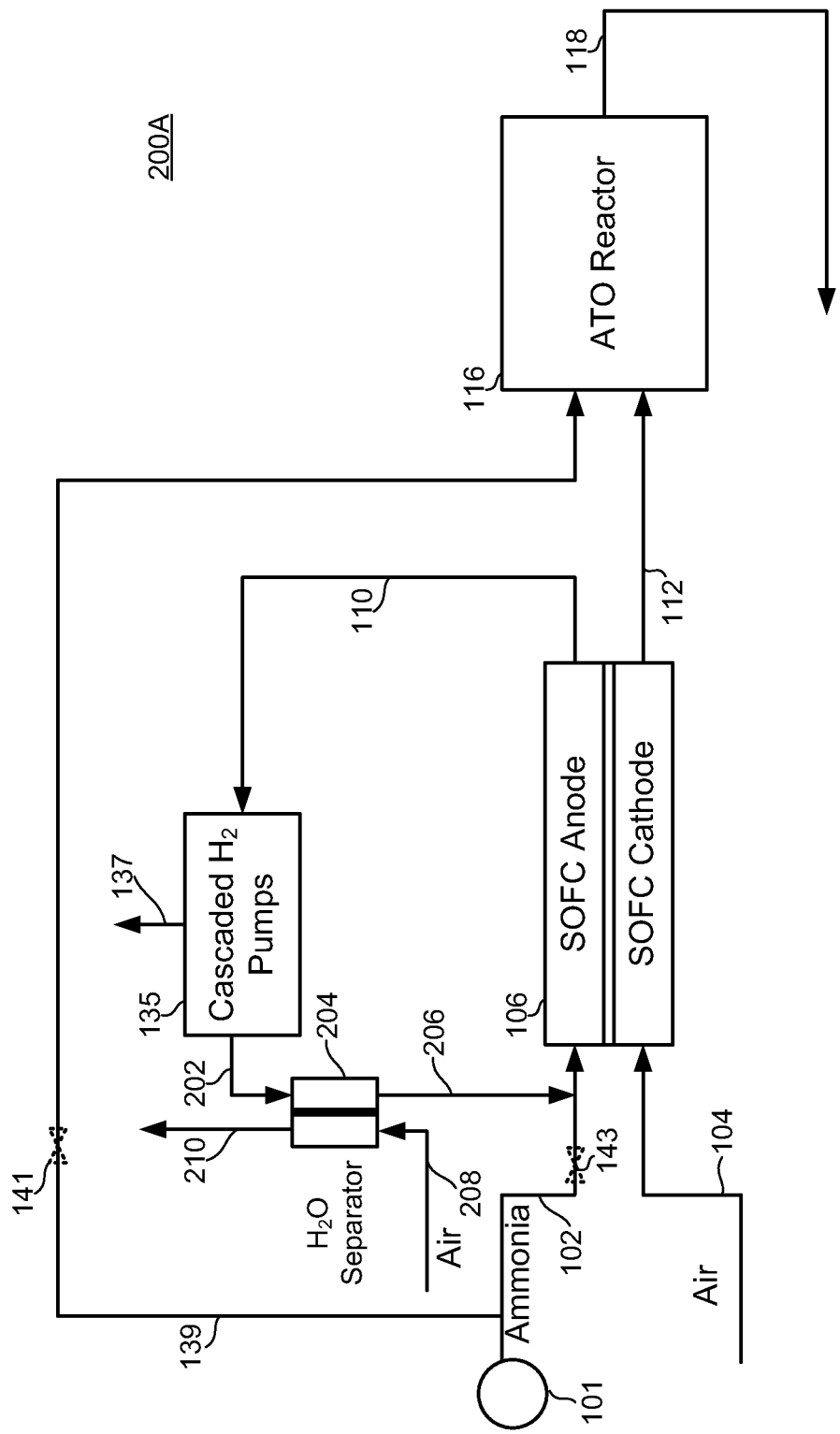

FIG. 2A illustrates a system 200A according to another embodiment of the invention. The system 200A is similar to system 100A illustrated in FIG. 1A and contains a number of components in common. Those components which are common to both systems 100A and 200A are numbered with the same numbers in FIGS. 1A and 2A and will not be described further.

One difference between systems 200A and 100A is that system 200A utilizes a water separator 204 in series with the cascaded hydrogen pumps 135. In an embodiment, the water separator 204 may be a single water separator. In an alternative embodiment, the water separator 204 may be a series of water separators. The utilization of the water separator 204 allows water to be removed from the portion of the recycled fuel exhaust stream recycled to the fuel cell stack 106. The removal of water from the recycled fuel exhaust stream may result in a minimum amount (potentially 0%) water remaining in the recycled fuel exhaust stream. In this manner, the recycled fuel exhaust stream exiting the water separator 204 may be comprised of essentially pure hydrogen ($H_2$) which may increase cell performance.

A purified, recycled hydrogen (i.e., nitrogen depleted fuel exhaust stream) exits the cascaded hydrogen pumps 135 via recycling conduit 202 and passes to a water separator 204. The stream exiting the cascaded hydrogen pumps 135 contains less nitrogen than the stream entering the cascaded hydrogen pumps 135. Water separator 204 may be any type water separator, such as a selective water vapor membrane separator. The water separator 204 preferably removes excess water from the purified recycled fuel exhaust stream and may discharge the water vapor into the atmosphere. In an embodiment, the water separator 204 may be biased by air provided by air conduit 208. The use of the water separator 204 biased by air allows water to be removed from the portion of the recycled fuel exhaust stream recycled to the fuel cell stack 106. The water separator 204 may continuously remove water from the recycled fuel exhaust stream entering via recycling conduit 202.

Water separator 204 may comprise a polymeric membrane separator. The membrane of water membrane separator 204 may be a Nafion® membrane. The selective water separator embodiment has the advantages of being low cost, low parasitic power, easy to integrate, and discharges the water vapor into the atmosphere. Water may be collected by the water separator 204 from recycling conduit 202 on the product side of the water separator 204. Water permeates across the membrane from the product side to collection side of water separator 204. The partial pressure of the water in the product side of the water separator 204 drives diffusion of the water across the membrane to the collection side of the water separator 204. Preferably the water separator 204 removes substantially 99% of the water from the recycled fuel exhaust stream. The water separator 204 may remove up to 100%, such as about 70%-100%, 100% to 99%, 99% to 98%, 98% to 97%, 97% to 96%, 96% to 95%, 95% to 90%, 90% to 80%, 80% to 70%, or 70%-1% of the remaining water from the recycled fuel exhaust stream.

The water depleted recycled fuel exhaust stream exiting the water separator 204 via conduit 206 contains less water than the recycled fuel exhaust stream that entered the water separator 204 via recycling conduit 202. Compared to the fuel exhaust stream originally exiting the fuel cell stack 106 via fuel exhaust conduit 110, the water depleted recycled fuel exhaust stream exiting the water separator 204 via recycling conduit 206 contains less water overall. The removal of water results in the water depleted recycled fuel exhaust stream in recycling conduit 206 having an increased proportion of hydrogen as a percentage of volume when compared to the fuel exhaust stream originally exiting the fuel cell stack 106 via the fuel exhaust conduit 110.

The water depleted recycled fuel exhaust stream exits the water separator 204 from the product side via recycling conduit 206 and the water depleted recycled fuel exhaust stream is provided back to the fuel inlet stream by the recycling conduit 206. The recycling of reduced nitrogen and water fuel exhaust into the fuel inlet increases the performance of the fuel cell stack 106.

Air may be provided to the collection side of the water separator 204 via air conduit 208 which is operatively and/or fluidly connected directly/indirectly to the collection side of the water separator 204. An air blower may be used to blow air into conduit 208. The air removes water from the collection side of the water separator 204. The water separator 204 is operatively and/or fluidly connected directly/indirectly to discharge conduit 210 and the air and water mixture flows from the collection side of the water separator 204 to the discharge conduit 210. Discharge conduit 210 may discharge the air and evaporated water mixture away from the fuel inlet stream or additionally out of the system 200, for example into the atmosphere as humid air or water vapor and air. The addition of air to the collection side of the water separator 204 biases the water separator 204 such that the partial pressure of water on the collection side is less than the partial pressure of water on the product side. The difference in partial pressure drives the diffusion of water across the membrane of the water separator 204.

Figure 2B:
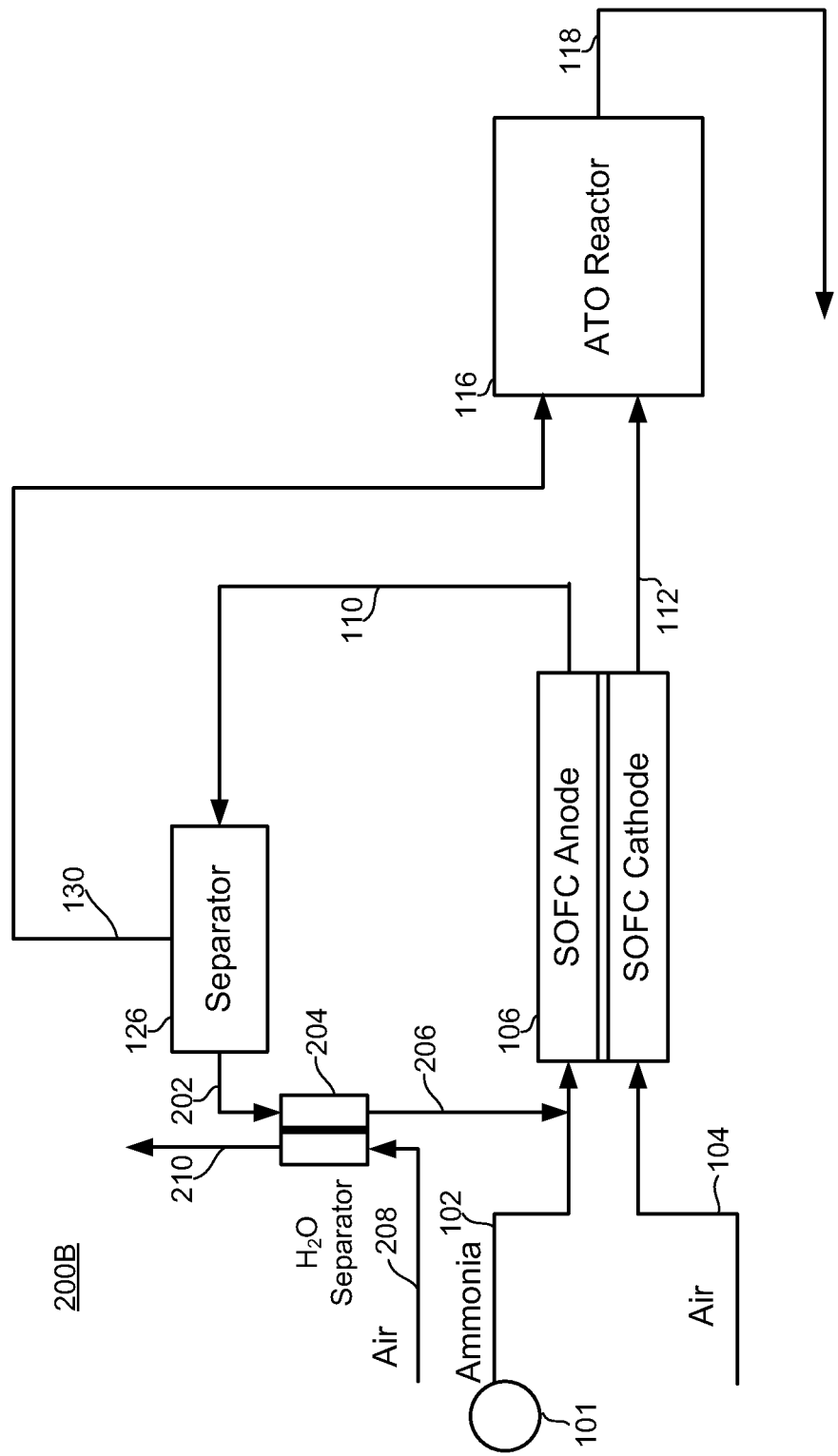

FIG. 2B illustrates a system 200B according to another embodiment of the invention. The system 200B is similar to system 100B illustrated in FIG. 1B and contains a number of components in common. Those components which are common to both systems 100B and 200B are numbered with the same numbers in FIGS. 1B and 2B and will not be described further.

One difference between systems 200B and 100B is that system 200B utilizes the water separator 204, described above with reference to FIG. 2A, in series with the separator 126. A purified, recycled nitrogen depleted fuel exhaust stream, exits the separator 126 via recycling conduit 202 and passes to a water separator 204. The stream exiting the separator 126 contains less nitrogen than the stream entering the separator 126. The water depleted recycled fuel exhaust stream exiting the water separator 204 via conduit 206 contains less water than the recycled fuel exhaust stream that entered the water separator 204 via recycling conduit 202. Compared to the fuel exhaust stream originally exiting the fuel cell stack 106 via fuel exhaust conduit 110, the water depleted recycled fuel exhaust stream exiting the water separator 204 via recycling conduit 206 contains less water overall. The removal of water results in the water depleted recycled fuel exhaust stream in recycling conduit 206 having an increased proportion of hydrogen as a percentage of volume when compared to the fuel exhaust stream originally exiting the fuel cell stack 106 via the fuel exhaust conduit 110. The water depleted recycled fuel exhaust stream exits the water separator 204 from the product side via recycling conduit 206 and the water depleted recycled fuel exhaust stream is provided back to the fuel inlet stream by the recycling conduit 206. The recycling of reduced nitrogen and water fuel exhaust into the fuel inlet increases the performance of the fuel cell stack 106. As described above with reference to FIG. 2A, air may be provided to the collection side of the water separator 204 via air conduit 208 which is operatively and/or fluidly connected directly/indirectly to the collection side of the water separator 204.

Figure 3:
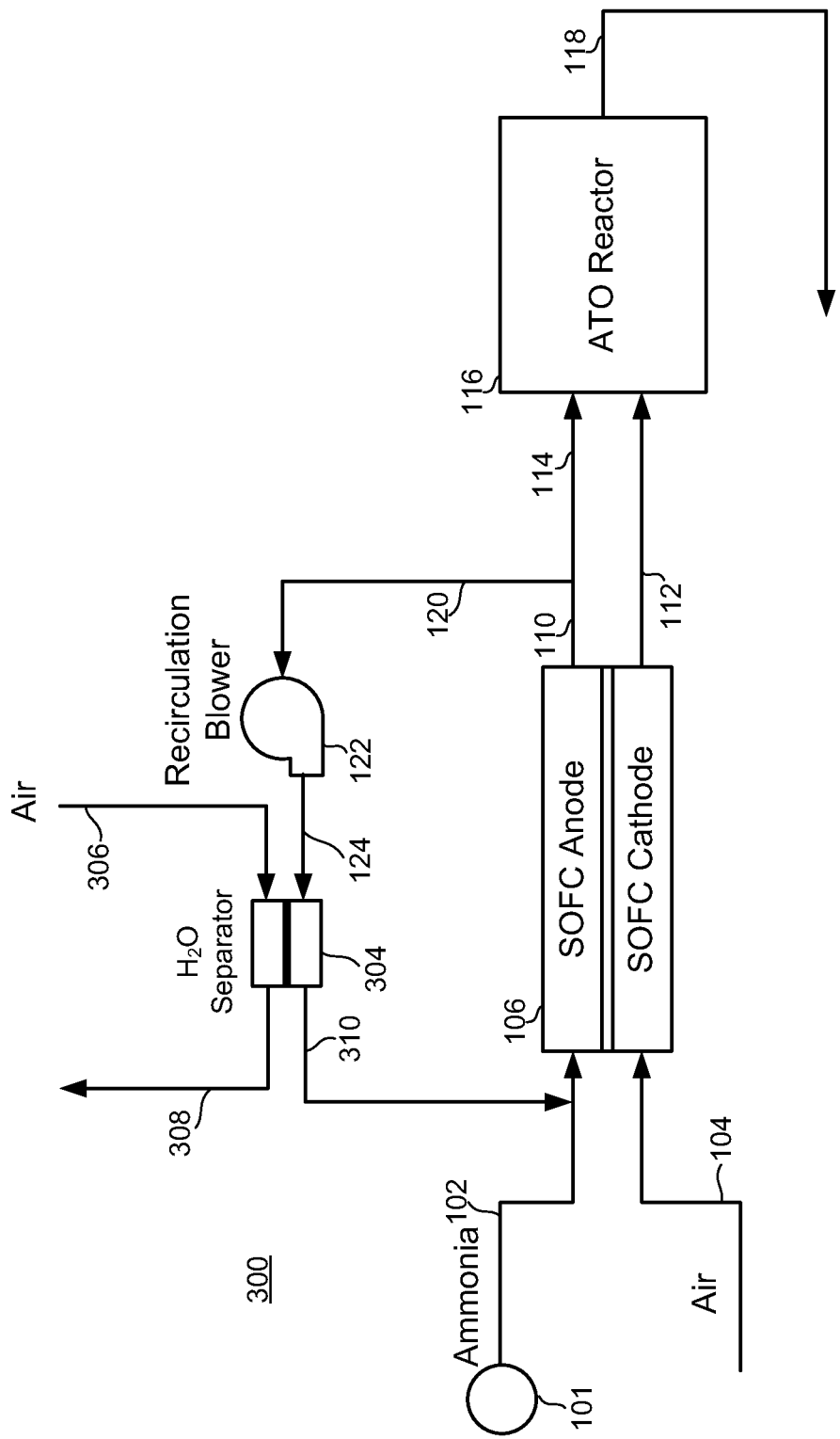

FIG. 3 illustrates a system 300 according to another embodiment of the invention. The system 300 is similar to system 100A illustrated in FIG. 1A and contains a number of components in common. Those components which are common to both systems 100A and 300 are numbered with the same numbers in FIGS. 1A and 3 and will not be described further.

One difference between systems 100A and 300 is that system 300 may utilize a water separator 304 as opposed to the hydrogen pump 126 or the cascaded hydrogen pumps 135. The system 300 further contains an anode tail gas oxidizer (ATO) reactor 116, a conduit 114 which provides part of the stack fuel exhaust directly into the ATO reactor, and a recirculation blower 122.

The system 300 operates as follows. The fuel inlet stream, such as ammonia ($NH_3$), is provided into the fuel cell stack 106 through fuel inlet conduit 102 from an ammonia fuel source 101. The fuel inlet conduit 102 provides the fuel inlet stream to the anode side of the cells in the fuel cell stack 106. Air or another oxygen containing gas is provided into the stack 106 through an air inlet conduit 104. The air inlet conduit 104 provides air to the cathode side of the cells in the fuel cell stack 106. Once the fuel, such as ammonia, and oxidant are provided into the fuel cell stack 106, the stack 106 is operated to generate electricity and a fuel exhaust stream.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. A first portion of the fuel exhaust stream from conduit 110 may be provided to the ATO reactor 116 via ATO input conduit 114 and a second portion of the fuel exhaust stream may be recycled via recycling conduit 120 (e.g., via a splitter or valve). The portion of fuel exhaust provided to the ATO reactor 116 and recycled via recycling conduit 120 may vary. For example 10% of the fuel exhaust may be provided to the ATO reactor 116 and 90% recycled. Alternatively, 50% of the fuel exhaust may be provided to the ATO reactor 116, while 50% is recycled. Additionally, 90% of the fuel exhaust or more may be provided to the ATO reactor 116, while 10% or less is recycled. Thus 10%-90% of the fuel exhaust may be recycled and 90%-10% of the fuel exhaust may be provided to the ATO reactor 116. The amount of recycled fuel exhaust provided into conduit 120 is controlled by blower 122 power or blowing speed. The fuel exhaust stream provided into conduits 114 and 120 may contain the same composition or content of nitrogen, hydrogen, and water. The ATO reactor uses the first portion of the fuel exhaust stream and air exhaust stream to oxidize anode tail gas and output heated oxidized fuel (i.e., reactor exhaust) to ATO exhaust conduit 118.

The recirculation blower 122 is coupled to recycling conduit 120 to provide the recycled fuel exhaust stream from recycling conduit 120 to the water separator 304 via recycling conduit 124. The recirculation blower 122 may be computer or operator controlled and may vary the amount and/or rate of the recycled fuel exhaust stream being provided to the water separator 304 and also the amount and/or rate of the recycled fuel exhaust stream being provided back to the stack 106. As such, the recirculation blower 122 may be used to increase or decrease the overall recycling rate in system 300.

In an embodiment, the water separator 304 may be a single water separator. In an alternative embodiment, the water separator 304 may be a series of water separators. The utilization of the water separator 304 allows water to be removed from the portion of the recycled fuel exhaust stream recycled to the fuel cell stack 106. The removal of water from the recycled fuel exhaust stream may result in a minimum amount (potentially 0%) water remaining in the recycled fuel exhaust stream. In this manner, while the recycled fuel exhaust stream exiting the water separator 304 may include nitrogen diluents, the reduction of water in the recycled fuel exhaust stream may increase cell performance.

The recycled fuel exhaust stream is provided from the blower 122 to the water separator 304 via recycling conduit 124. Water separator 304 may be any type water separator, such as a selective water vapor membrane separator. The water separator 304 preferably removes excess water from the recycled fuel exhaust stream and may discharge the water vapor into the atmosphere. In an embodiment, the water separator 304 may be biased by air provided by air conduit 306. The use of the water separator 304 biased by air allows water to be removed from the portion of the recycled fuel exhaust stream recycled to the fuel cell stack 106. The water separator 304 may continuously remove water from the recycled fuel exhaust stream entering via recycling conduit 124.

Water separator 304 may comprise a polymeric membrane separator, similar to separator 204. The membrane of water membrane separator 304 may be a Nafion® membrane. The selective water separator embodiment has the advantages of being low cost, low parasitic power, easy to integrate, and discharges the water vapor into the atmosphere. Water may be collected by the water separator 304 from recycling conduit 124 on the product side of the water separator 304. Water permeates across the membrane from the product side to collection side of water separator 304. The partial pressure of the water in the product side of the water separator 304 drives diffusion of the water across the membrane to the collection side of the water separator 304. Preferably the water separator 304 removes substantially 99% of the water from the recycled fuel exhaust stream. The water separator 304 may remove up to 100%, such as about 70%-100%; such as about 100% to 99%, 99% to 98%, 98% to 97%, 97% to 96%, 96% to 95%, 95% to 90%, 90% to 80%, 80% to 70%, or 70%-1% of the water from the recycled fuel exhaust stream.

The water depleted recycled fuel exhaust stream exiting the water separator 304 contains less water than the recycled fuel exhaust stream that entered the water separator 304 via recycling conduit 124. Compared to the fuel exhaust stream originally exiting the fuel cell stack 106 via fuel exhaust conduit 110, the water depleted recycled fuel exhaust stream exiting the water separator 304 via recycling conduit 310 contains less water overall. The removal of water results in the water depleted recycled fuel exhaust stream in recycling conduit 310 having an increased proportion of hydrogen as a percentage of volume when compared to the fuel exhaust stream originally exiting the fuel cell stack 106 via the fuel exhaust conduit 110.

The water depleted recycled fuel exhaust stream exits the water separator 304 from the product side via recycling conduit 310 and the water depleted recycled fuel exhaust stream is provided back to the fuel inlet stream by the recycling conduit 310. The recycling of reduced water fuel exhaust into the fuel inlet increases the performance of the fuel cell stack 106.

Air may be provided to the collection side of the water separator 304 via air conduit 306 which is operatively and/or fluidly connected directly/indirectly to the collection side of the water separator 304. An air blower may be used to blow air into conduit 306. The air removes water from the collection side of the water separator 304. The water separator 304 is operatively and/or fluidly connected directly/indirectly to discharge conduit 308 and the air and water mixture flows from the collection side of the water separator 304 to the discharge conduit 308. Discharge conduit 308 may discharge the air and evaporated water mixture away from the fuel inlet stream or additionally out of the system 300, for example into the atmosphere as humid air or water vapor and air. The addition of air to the collection side of the water separator 304 biases the water separator 304 such that the partial pressure of water on the collection side is less than the partial pressure of water on the product side. The difference in partial pressure drives the diffusion of water across the membrane of the water separator 304.

Figure 4:
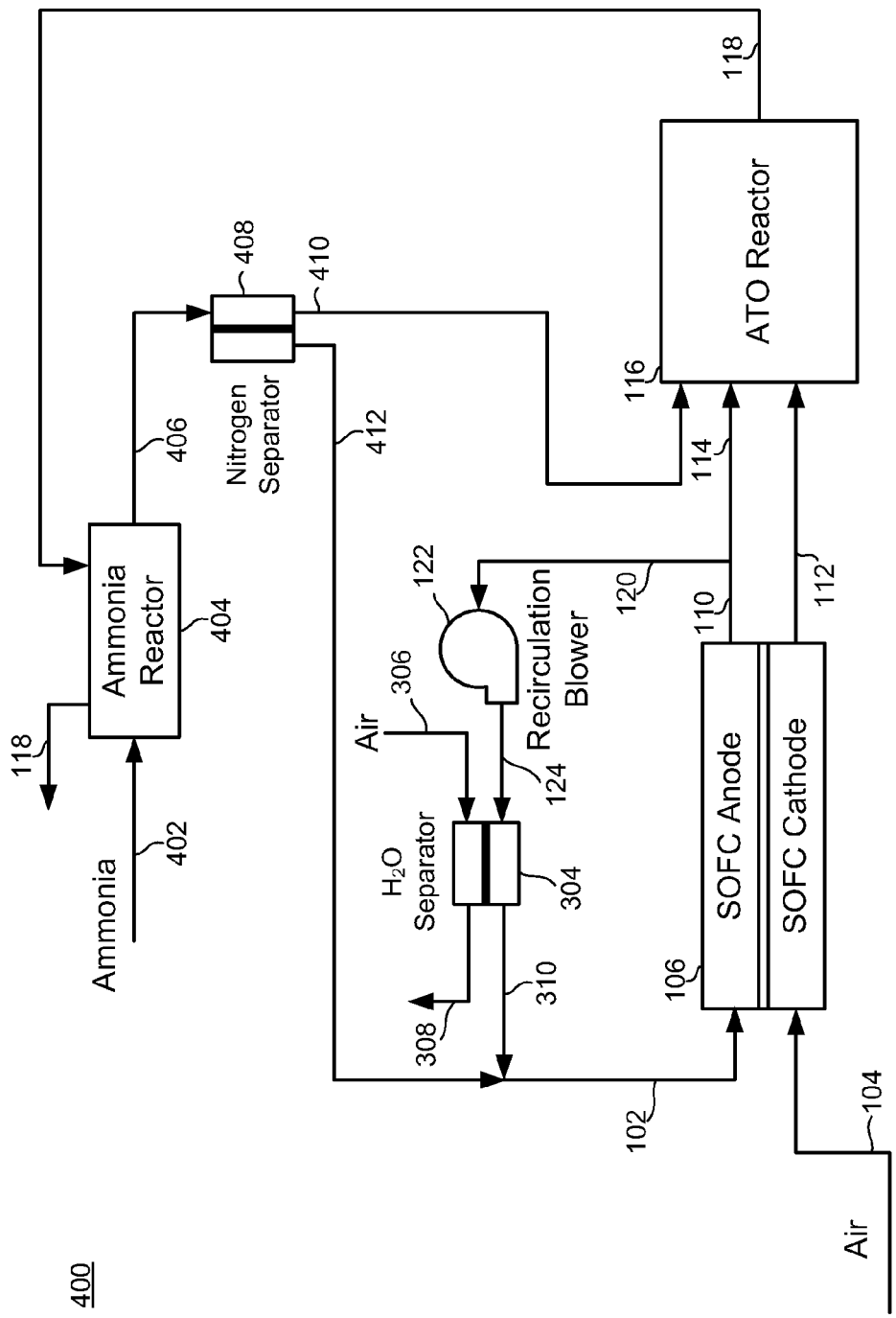

FIG. 4 illustrates a system 400 according to another embodiment of the invention. The system 400 is similar to system 300 illustrated in FIG. 3 and contains a number of components in common. Those components which are common to both systems 300 and 400 are numbered with the same numbers in FIGS. 3 and 4 and will not be described further.

One difference between systems 300 and 400 is that system 400 may utilize an ammonia reactor 404 and nitrogen separator 408 in the fuel inlet stream path to remove nitrogen from the fuel, such as ammonia ($NH_3$), before providing the fuel inlet stream into the fuel cell stack 106 through fuel inlet conduit 102. Ammonia reactor 404 may be any type reactor configured to disassociate ammonia ($NH_3$) into nitrogen ($N_2$) and hydrogen ($H_2$), such as a catalytic ammonia reactor. Nitrogen separator 408 may be any type nitrogen separator, such as separator 126 or separators 135 as discussed in relation to FIGS. 1A and 1B above. For example, the nitrogen separator 408 may be a hydrogen separator pumping hydrogen and therefore separating nitrogen from a stream containing only hydrogen and nitrogen.

Fuel, such as ammonia ($NH_3$), may be input to ammonia reactor 404 via an ammonia inlet conduit 402 operatively and/or fluidly connected directly/indirectly to an inlet side of the ammonia reactor 404. The ammonia reactor 404 may disassociate ammonia ($NH_3$) into nitrogen ($N_2$) and hydrogen ($H_2$) to create a fuel flow of nitrogen and hydrogen. The fuel flow of nitrogen and hydrogen may be provided from an outlet side of the ammonia reactor 404 to the nitrogen separator 408 via an output conduit 406.

The nitrogen separator 408 removes nitrogen ($N_2$) and trace amounts of hydrogen ($H_2$) from the fuel flow. Preferably, the nitrogen separator 408 removes substantially all the nitrogen from the fuel flow. The nitrogen separator 408 may remove less than 50%, or more than 50%, such as 50%-100%, e.g., 50% to 60%, 60% to 70%, 70% to 80%, 80% to 90%, or 90% to 100%, such at about 98%, about 99%, or about 99.5% of the nitrogen from the fuel flow. In this manner, the fuel output of the nitrogen separator may be comprised of essentially pure hydrogen ($H_2$). Fuel inlet conduit 412 may be operatively and/or fluidly connected directly/indirectly to an output of the nitrogen separator 408 and fuel inlet conduit 412 may be adapted to provide hydrogen from the nitrogen separator 408 to fuel inlet conduit 102 and subsequently the fuel cell stack 106. Hydrogen from the water separator 304 may be provided into conduit 412 and/or 102 via conduit 310. In this manner, the fuel inlet conduit 102 of the fuel cell stack 106 may be provided essentially pure hydrogen ($H_2$) which may increase cell performance. Discharge conduit 410 may discharge the separated nitrogen and any remaining hydrogen away from the fuel inlet stream and into the ATO reactor 116. The ATO reactor 116 uses the combined fuel stream from conduit 114, air exhaust stream from conduit 112, and separated nitrogen and any remaining hydrogen from conduit 410 to output heated oxidized fuel (i.e., ATO reactor exhaust) to ATO exhaust conduit 118. In an embodiment, the ATO exhaust conduit 118 may be thermally integrated with the ammonia reactor 404 to heat the ammonia reactor 404 with the heated oxidized fuel output from the ATO reactor 116. As used herein, thermally integrated means positioned to exchange heat between the conduit 118 and the reactor 404. The heat exchange may be via a heat exchanger, proximal positioning of conduit and reactor, physical contact of the conduit and the reactor, by use of a heat exchange fluid in thermal contact with the conduit and reactor or any other suitable method.

Figure 5:
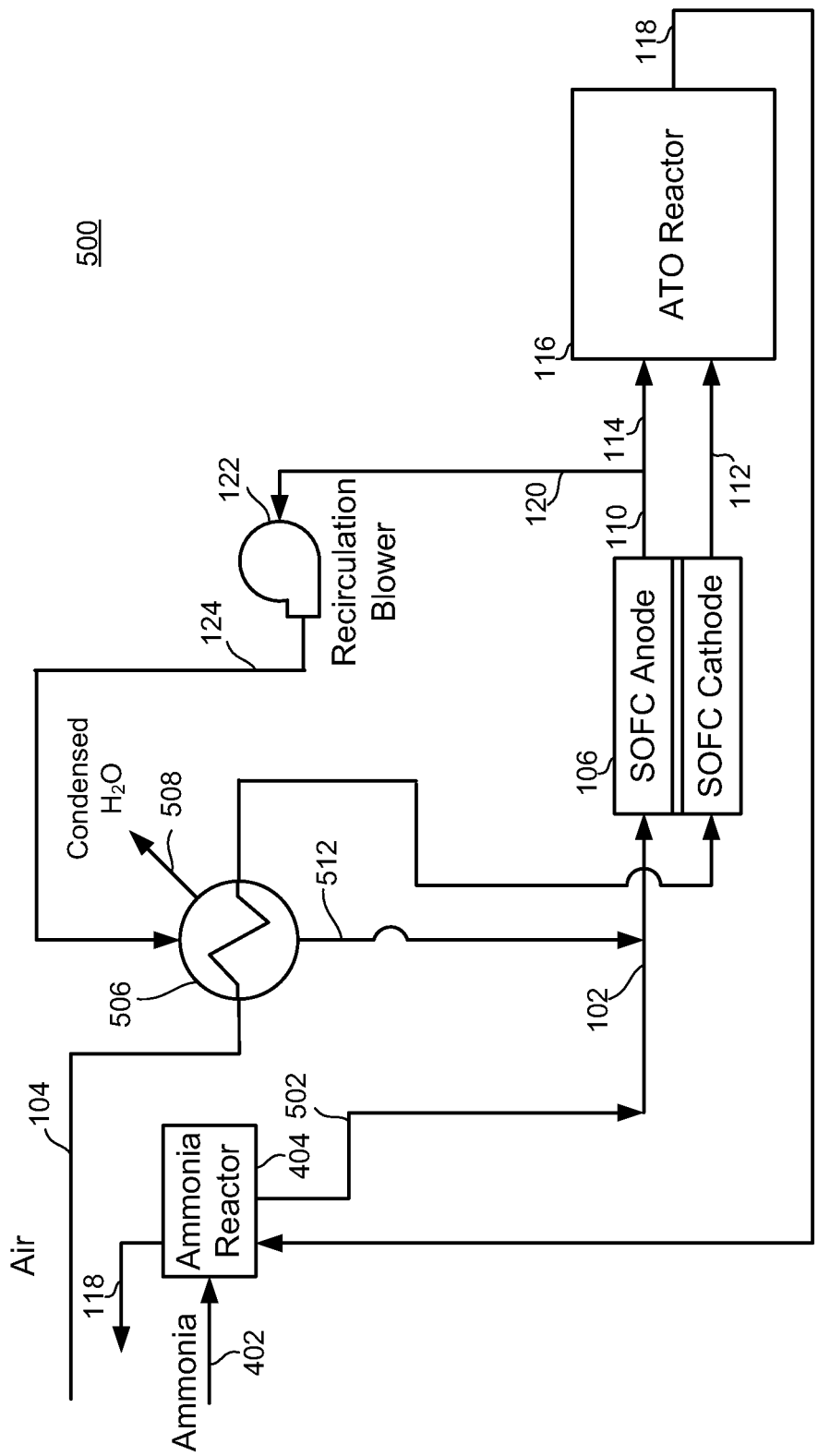

FIG. 5 illustrates a system 500 according to another embodiment of the invention. The system 500 is similar to system 400 illustrated in FIG. 4 and contains a number of components in common. Those components which are common to both systems 400 and 500 are numbered with the same numbers in FIGS. 4 and 5 and will not be described further.

One difference between systems 500 and 400 is that system 500 may not utilize a nitrogen separator 408 and/or may utilize a heat exchanger/condenser 506 instead of a water separator 304 to remove water from the recycled fuel exhaust stream. The heat exchanger/condenser 506 may be any type heat exchanger/condenser, such as a condenser separator where steam is cooled to liquid water, which settles to the bottom of the separator while remaining gases (e.g., hydrogen and nitrogen, etc) exit via recycling conduit 512. Recycling conduit 512 may provide hydrogen ($H_2$) to fuel inlet conduit 102. In this manner, the heat exchanger/condenser 506 may generate a purified recycled fuel exhaust stream in recycling conduit 512 having less water as a percentage of volume when compared to the fuel exhaust stream originally exiting the fuel cell stack 106 via the fuel exhaust conduit 110. The heat exchanger/condenser 506 continuously removes water from the recycled fuel exhaust stream entering via recycling conduit 124. A drain 508 in the heat exchanger/condenser 506 may provide the collected water away from the fuel inlet stream or additionally out of the system 500. Preferably the heat exchanger/condenser 506 removes substantially 50% of the water from the recycled fuel exhaust stream. The heat exchanger/condenser 506 may remove less than 50%, such as about 50%-40%, 40%-30%, 30%-20%, 20%-10%, 10%-1%, 5%, 0.99%, 0.01%, or 0.001% of the water from the recycled fuel exhaust stream.

In an embodiment, ammonia fuel input into the system 500 may be disassociated into nitrogen ($N_2$) and hydrogen ($H_2$) by the ammonia reactor 404, and the nitrogen and hydrogen may be provided from the ammonia reactor via fuel conduit 502 into the fuel inlet conduit 102 of the fuel cell stack 106. If desired, a nitrogen ($N_2$) separator 408 may be provided in the fuel conduit 502. If desired, the conduit 118 may be thermally integrated with reactor 404 to heat the reactor 404 as described with respect to FIG. 3.

In an embodiment, air, such as cathode air, from air inlet conduit 104 may be used to condense water in recycled fuel exhaust in the heat exchanger/condenser 506. In this manner, nitrogen and hydrogen from the ammonia reactor 404 may be provided directly to the fuel inlet conduit 102 of the fuel cell stack 106 and/or through a nitrogen separator 408, while a cool cathode air inlet stream is passed via the air inlet conduit 104 through the heat exchanger/condenser 506.

Figure 6:
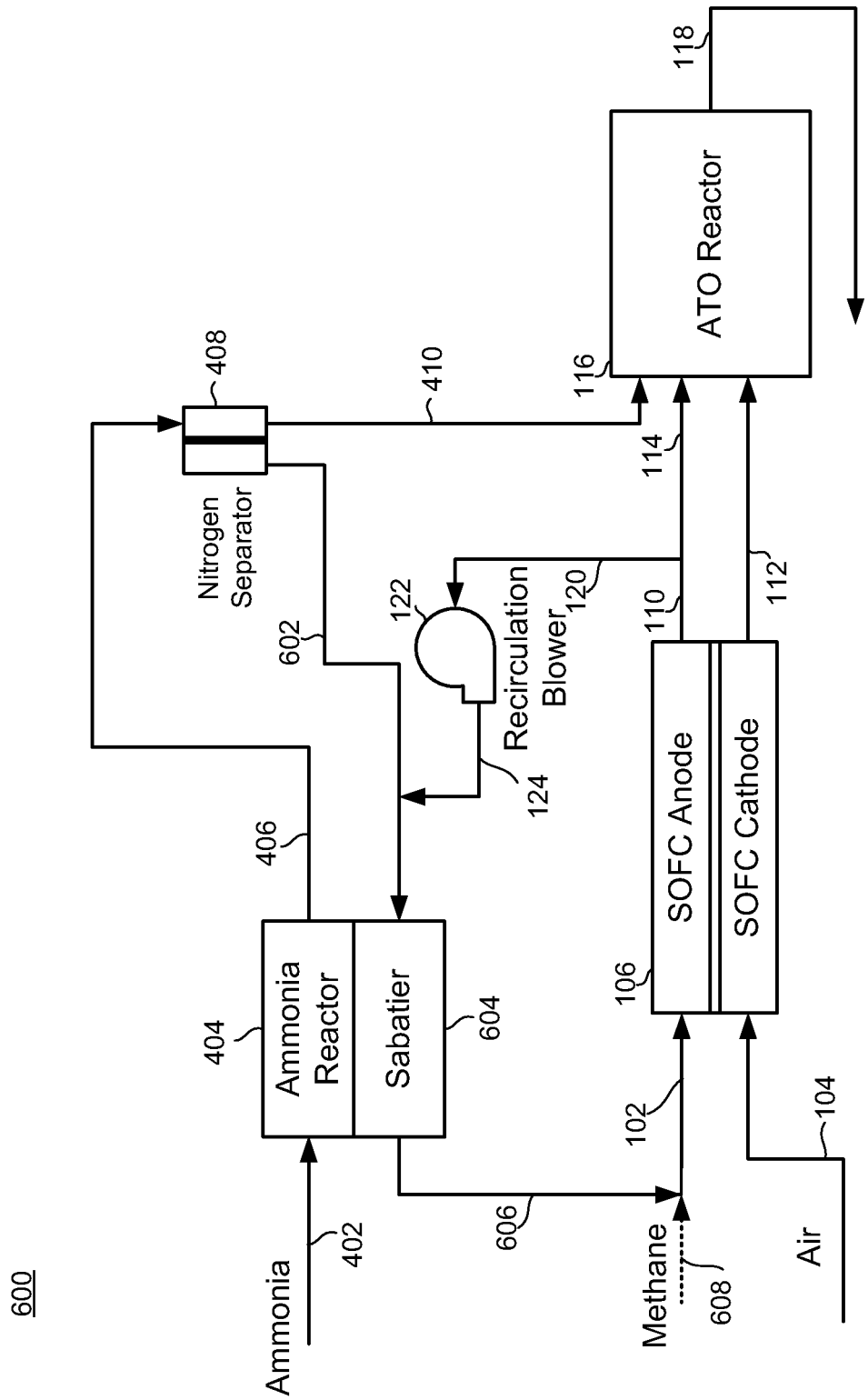

FIG. 6 illustrates a system 600 according to an embodiment of the invention. The system 600 is similar to system 400 illustrated in FIG. 4 and contains a number of components in common. Those components which are common to both systems 400 and 600 are numbered with the same numbers in FIGS. 4 and 6 and will not be described further.

Differences between systems 600 and 400 include that system 600 may not utilize a water separator 304, may utilize a Sabatier reactor 604 to convert ammonia ($NH_3$) into methane ($CH_4$), and may include an additional methane or natural gas fuel inlet stream. Another difference is that the ATO exhaust conduit 118 may or may not be thermally integrated with the ammonia reactor 404 to heat the ammonia reactor 404 with the heated oxidized fuel output from the ATO reactor 116. Instead, the Sabatier reactor 604 may be thermally integrated with the ammonia reactor 404 and the heat of the exothermic reaction in the Sabatier reactor may be used to heat the ammonia reactor. The Sabatier reactor 604 may be a methane forming Sabatier reactor containing a catalyst which may convert received hydrogen ($H_2$), carbon monoxide (CO), water ($H_2O$), and carbon dioxide ($CO_2$) into methane ($CH_4$). The Sabatier reaction is an exothermic reaction, and in an embodiment the Sabatier reactor 604 may be in thermal communication (e.g., direct physical contact and/or in proximity or coupled via a heat transfer fluid loop or region for conductive, convective, and/or radiative heat transfer) with the ammonia reactor 404 to provide heat from the Sabatier reaction to aide in the disassociation of ammonia ($NH_3$) into nitrogen ($N_2$) and hydrogen ($H_2$) by the ammonia reactor 404. The Sabatier reaction may generate methane ($CH_4$) according to the following reaction:

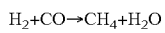

$$H_2 + CO \rightarrow CH_4 + H_2O$$

In operation, hydrogen from the nitrogen separator 408 may be provided into output conduit 602. The recycling conduit 124 may provide recycled fuel exhaust from the fuel cell stack 106 to the output conduit 602. The output conduit may be operatively and/or fluidly connected directly/indirectly to an inlet of the Sabatier reactor 604 and may provide hydrogen ($H_2$) from the nitrogen separator 408 as well as recycled fuel exhaust from the fuel cell stack 106, including hydrogen ($H_2$), carbon monoxide (CO), water ($H_2O$), and carbon dioxide ($CO_2$), to the Sabatier reactor 604. The Sabatier reactor 604 may generate methane ($CH_4$), hydrogen ($H_2$), carbon monoxide (CO), water ($H_2O$), and carbon dioxide ($CO_2$) which may be provided into fuel inlet conduit 606 which may in turn provide the generated generate methane ($CH_4$), hydrogen ($H_2$), carbon monoxide (CO), water ($H_2O$), and carbon dioxide ($CO_2$) to the fuel inlet conduit 102 of the fuel cell stack 106.

In an embodiment, a hydrocarbon containing fuel, such as pure methane ($CH_4$) or natural gas, from a fuel inlet conduit 608 may also be provided as a fuel to the fuel inlet conduit 102 in addition to the ammonia provided via fuel inlet conduit 402 to generate the above described $CO + CO_2$ in the fuel exhaust stream. The combination of ammonia and methane fuels may reduce the greenhouse gases generated by 50% when compared to methane only fuel cell systems. The methane SOFC reactions in the fuel cell stack 106 may be maintained which may negate the need for redesign of a methane based fuel cell system hot box. Carbon dioxide recovery may not be required to maintain the sustainability of the process.

Figure 7:
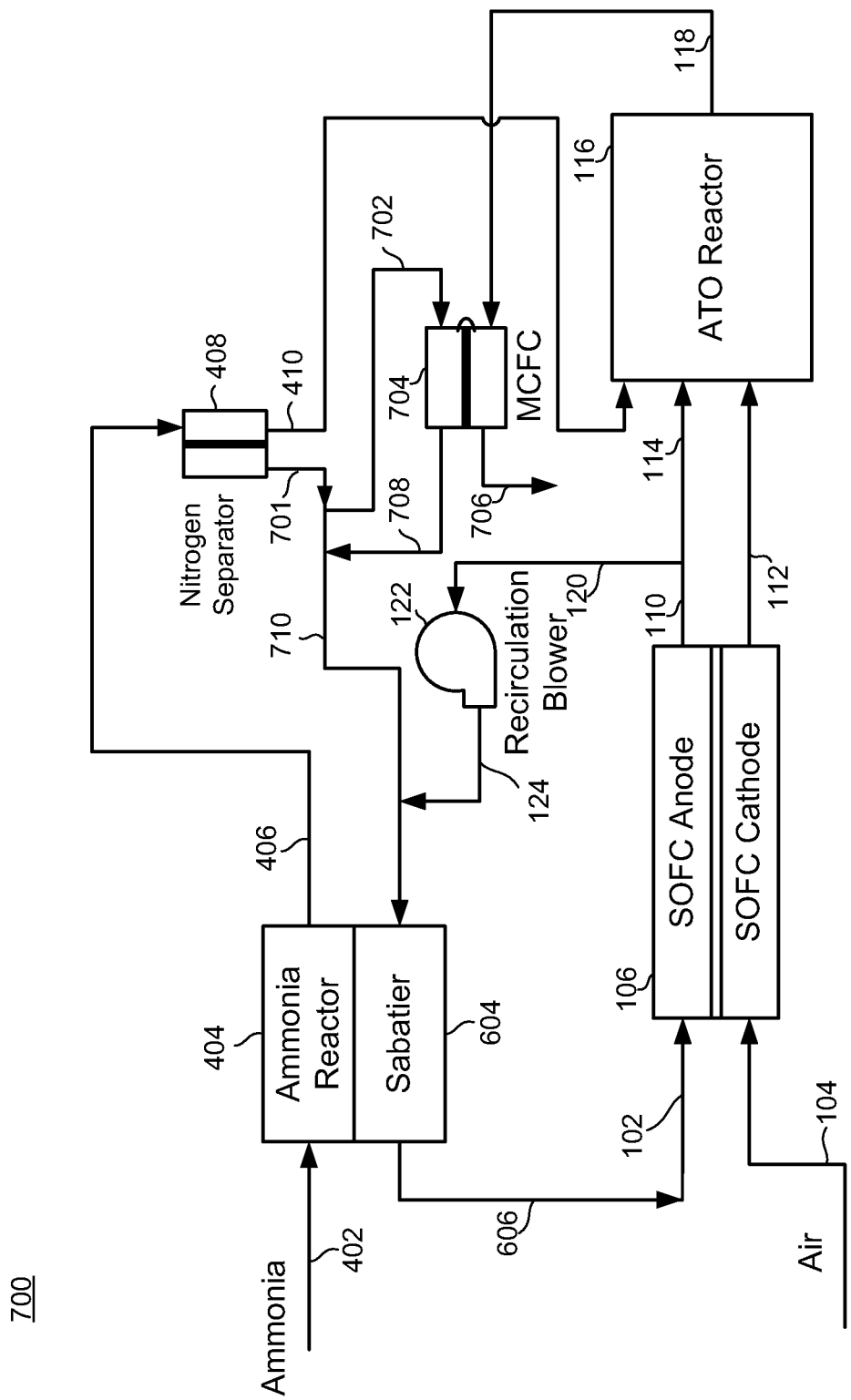

FIG. 7 illustrates a system 700 according to an embodiment of the invention. The system 700 is similar to system 600 illustrated in FIG. 7 and contains a number of components in common. Those components which are common to both systems 600 and 700 are numbered with the same numbers in FIGS. 6 and 7 and will not be described further.

One difference between systems 700 and 600 is that system 700 includes molten-carbonate fuel cell (MCFC) 704. The MCFC 704 may be a MCFC stack operating in fuel cell mode in which the anode and cathode of each of the MCFCs are connected by a shunt/resistor.

Hydrogen from the nitrogen separator 408 may be provided into output conduit 701. Output conduit 701 is configured to provide a portion of the hydrogen to the MCFC 704 via output conduit 702 and a portion of the hydrogen to the Sabatier reactor 604 via output conduit 710. The portion of hydrogen provided to the MCFC 704 and the output conduit 710 may vary. Output conduit 710 may be operatively and/or fluidly connected directly/indirectly to recycling conduit 124 and may receive recycled fuel exhaust from the fuel cell stack 106, including hydrogen ($H_2$), carbon monoxide (CO), water ($H_2O$), and carbon dioxide ($CO_2$).

Output conduit 702 may operatively connect the nitrogen separator 408 to the anode side of the MCFC 704. An oxidized exhaust stream of tail gas from ATO exhaust conduit 118 may be recycled to the cathode side of the MCFC 704. Once the hydrogen from the output conduit 702 is received in the anode of the MCFC 704 and tail gas is received in the cathode of the MCFC 704, the MCFC 704 may be operated in fuel cell mode to generate electricity. Carbon dioxide ($CO_2$) from the ATO exhaust stream may be transferred from the cathode side across the electrolyte of the MCFC 704 to the anode side of the MCFC. Hydrogen ($H_2$), carbon dioxide ($CO_2$), and water ($H_2O$) may be output from the anode side of the MCFC 704 to output conduit 708. Output conduit 708 may operatively connect the MCFC 704 to conduit 710. In output conduit 710, the hydrogen ($H_2$), carbon dioxide ($CO_2$), and water ($H_2O$) output by the MCFC 704, hydrogen ($H_2$) output by the nitrogen separator 408, and recycled fuel exhaust from the fuel cell stack may mix together and be provided to the Sabatier reactor 604. Exhaust conduit 706 may receive air and water from the cathode side of the MCFC 704 and may output the air and water away for the fuel inlet and additionally out of the system 700.

The use of the MCFC 704 with the Sabatier reactor 604 may enable ammonia fuel to be used while eliminating the exhaust of greenhouse gases from the system 700. The methane SOFC reactions in the fuel cell stack 106 may be maintained which may negate the need for redesign of a methane based fuel cell system hot box operated with ammonia fuel. The carbon dioxide in the exhaust may be combined with the ambient air carbon dioxide which is recovered for sustainability of the process.

In any of the various embodiments discussed above, the fuel cell stack 106 may comprise cascading fuel cell stacks. In cascading fuel cell stacks, the effluent of one stack or a plurality of stacks may be routed to another stack or plurality of stacks. In a cascaded architecture, higher single pass fuel utilizations may be realized. The multiple stacks forming a stage of the cascade may be electrically connected in series (i.e., all run at the same current) or operated with independent current control. Cascading architectures may include two or more cascaded stages. In an embodiment, when used with a recirculation loop (i.e., a fuel cell stack exhaust recycling loop), part of the overall cascade architecture may be in the recirculation loop and part of the cascade architecture may be outside the recirculation loop. In an alternative embodiment, all the stages of the cascade architecture may be inside the recirculation loop. Cascading may homogenize the fuel between cascaded stages reducing the effects of fuel maldistribution inside the first stages of the cascade architecture. The difference between fuel depletion at the inlet and outlet of each stage may be smaller in a cascaded architecture. The local electrochemical potential (i.e., driving potential or Nernst potential) may be more uniform within the cells of one stage, and therefore, the current distribution may be more uniform leading to lower Ohmic (i.e., resistive) losses an higher operating efficiencies. A drawback may be that cascading often results in high volume flow rates through the downstream stages of the cascade leading to higher pressure drops.

The fuel cell systems described herein may have other embodiments and configurations, as desired. Other components, such as fuel side exhaust stream condensers, heat exchangers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Furthermore, it should be understood that any system element or method steps described in any embodiment and/or illustrated in any figure may also be used in systems and/or methods of other suitable embodiments described above even if such use is not expressly described.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. A method of operating a fuel cell system, comprising:
providing a fuel inlet stream comprising ammonia;
providing the fuel inlet stream into a solid oxide fuel cell stack;
operating the solid oxide fuel cell stack to generate a fuel exhaust stream;
separating at least a portion of hydrogen from a first portion of the fuel exhaust stream using a hydrogen separator to generate a purified fuel exhaust stream, wherein the hydrogen separator is a plurality of cascaded hydrogen pumps;
recycling the purified fuel exhaust stream to the fuel inlet stream;
providing a portion of the fuel inlet stream comprising ammonia to an ATO, wherein the ATO does not receive any portion of the fuel exhaust stream; and
providing air from the solid oxide fuel cell stack to the ATO.

* * * * *